US008112758B2

(12) United States Patent
Jain et al.

(10) Patent No.: US 8,112,758 B2
(45) Date of Patent: Feb. 7, 2012

(54) METHODS AND APPARATUS FOR RESOURCE ALLOCATION IN PARTIAL FAULT TOLERANT APPLICATIONS

(75) Inventors: Navendu Jain, Austin, TX (US); Yoonho Park, Chappaqua, NY (US); Deepak S. Turaga, Nanuet, NY (US); Chitra Venkatramani, Roslyn Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/970,841

(22) Filed: Jan. 8, 2008

(65) Prior Publication Data

US 2009/0178046 A1 Jul. 9, 2009

(51) Int. Cl.
*G06F 9/46* (2006.01)

(52) U.S. Cl. ........ 718/104; 718/102; 718/103; 711/170; 711/171; 711/172; 711/173; 712/214; 712/215; 715/804; 715/805

(58) Field of Classification Search ........................ None
See application file for complete search history.

(56) References Cited

U.S. PATENT DOCUMENTS

| | | | | |
|---|---|---|---|---|
| 5,544,330 | A * | 8/1996 | Bither et al. | 710/100 |
| 7,158,926 | B2 | 1/2007 | Kampe | |
| 7,409,586 | B1 * | 8/2008 | Bezbaruah et al. | 714/13 |
| 7,669,087 | B1 * | 2/2010 | Johnsen et al. | 714/6.32 |
| 2003/0208470 | A1 * | 11/2003 | MacLellan et al. | 707/1 |
| 2008/0114870 | A1 * | 5/2008 | Pu | 709/224 |
| 2008/0263555 | A1 * | 10/2008 | Ventroux et al. | 718/103 |

OTHER PUBLICATIONS

D.J. Abadi, "The Design of the Borealis Stream Processing Engine," Proceedings of the CIDR Conference, Jan. 2005, pp. 277-289.
M. Balazinska et al., "Fault-Tolerance in the Borealis Distributed Stream Processing System," ACM SIGMOD, Jun. 2005, pp. 13-24.
N. Bansal et al., "Towards Optimal Operator Placement in Partial-Fault Tolerant Applications," Technical Report, Dec. 2007, pp. 1-13.

(Continued)

*Primary Examiner* — Emerson Puente
*Assistant Examiner* — Sisley Kim
(74) *Attorney, Agent, or Firm* — William Stock; Ryan, Mason & Lewis, LLP

(57) ABSTRACT

Techniques are disclosed for allocation of resources in a distributed computing system. For example, a method for allocating a set of one or more components of an application to a set of one or more resource groups includes the following steps performed by a computer system. The set of one or more resource groups is ordered based on respective failure measures and resource capacities associated with the one or more resource groups. An importance value is assigned to each of the one or more components, wherein the importance value is associated with an affect of the component on an output of the application. The one or more components are assigned to the one or more resource groups based on the importance value of each component and the respective failure measures and resource capacities associated with the one or more resource groups, wherein components with higher importance values are assigned to resource groups with lower failure measures and higher resource capacities. The application may be a partial fault tolerant (PFT) application that comprises a set of one or more PFT application components. The set of one or more resource groups may comprise a heterogeneous set of resource groups (or clusters).

20 Claims, 3 Drawing Sheets

OTHER PUBLICATIONS

B. Chun et al., "Workload and Failure Characterization on a Large-Scale Federated Testbed," Intel Research Berkeley Technical Report, IRB-TR-03-040, Nov. 2003, pp. 1-14.

R. Mc Dougall, "Availability—What It Means, Why It's Important, and How to Improve It," Sun BluePrints Online, Oct. 1999, pp. 1-9.

P.B. Gibbons et al., "IrisNet: An Architecture for a Worldwide Sensor Web," IEEE Pervasive Computing, Oct.-Dec. 2003, pp. 22-33, vol. 2, No. 4.

T. Heath et al., "Improving Cluster Availability Using Workstation Validation," ACM SIGMETRICS, Jun. 2002, pp. 217-227, vol. 30, No. 1.

J. Hennessy, "The Future of Systems Research," IEEE, Aug. 1999, pp. 27-33, vol. 32, No. 8.

R. Huebsch et al., "Querying the Internet with PIER," Proceedings of the 29th International Conference on Very Large Databases (VLDB), Sep. 2003, pp. 321-332, vol. 29.

J-H. Hwang et al., "A Cooperative, Self-Configuring High-Availability Solution for Stream Processing," IEEE 23rd International Conference on Data Engineering (ICDE), Apr. 2007, pp. 176-185.

N. Jain et al., "Design, Implementation, and Evaluation of the Linear Road Benchmark on the Stream Processing Core," ACM SIGMOD, Jun. 2006, pp. 431-442.

F. Junqueira et al., "Coterie Availability in Sites (Extended Version)," Proceedings of the 19th International Symposium on Distributed Computing (DISC), Jul. 2005, pp. 3-17.

S. Kartik et al., "Task Allocation Algorithms for Maximizing Reliability of Distributed Computing Systems," IEEE Transactions on Computers, Jun. 1997, pp. 719-724, vol. 46, No. 6.

Y. Ling et al., "A Variational Calculus Approach to Optimal Checkpoint Placement," IEEE Transactions on Computers, Jul. 2001, pp. 699-708, vol. 50, No. 7.

S. Nath et al., "Subtleties in Tolerating Correlated Failures in Wide-Area Storage Systems," USENIX, 3rd Symposium on Networked Systems Design and Implementation (NSDI), May 2006, pp. 225-238.

R.K. Sahoo et al., "Failure Data Analysis of a Large-Scale Heterogeneous Server Environment," IEEE, Proceedings of the International Conference on Dependable Systems and Networks (DSN), Jun.-Jul. 2004, pp. 772-781.

B. Schroeder et al., "A Large-Scale Study of Failures in High-Performance Computing Systems," Proceedings of the International Conference on Dependable Systems and Networks (DSN), Jun. 2006, pp. 249-258.

U. Srivastava et al., "Operator Placement for In-Network Stream Query Processing," Symposium on Principles of Database Systems (PODS), Jun. 2005, pp. 250-258.

D.S. Turaga et al., "Online FDC Control Limit Tuning with Yield Prediction Using Incremental Decision Tree Learning," Sematech AEC/APC Symposium XIX, 2007, 2 pages.

P. Yalagandula et al., "A Scalable Distributed Information Management System," ACM SIGCOMM, Aug.-Sep. 2004, pp. 379-390.

H. Yu et al., "Availability of Multi-Object Operations," USENIX, 3rd Symposium on Networked Systems Design & Implementation (NSDI), May 2006, pp. 211-224.

H. Yu et al., "The Costs and Limits of Availability for Replicated Services," ACM Symposium on Operating Systems Principles (SOSP), Oct. 2001, pp. 29-42.

Y. Zhang et al., "Performance Implications of Failures in Large-Scale Cluster Scheduling," USENIX, Proceedings of 10th Workshop on Jon Scheduling Strategies for Parallel Processing (JSSPP), Jun. 2004, pp. 173-186.

M. Castro et al., "Practical Byzantine Fault Tolerance," Proceedings of the 3rd Symposium on Operating Systems Design and Implementation (OSDI), Feb. 1999, pp. 1-14.

L. Amini et al., "SPC: A Distributed, Scalable Platform for Data Mining," Proceedings of the 4th International Workshop on Data Mining Standards, Services and Platforms (DM-SSP), Aug. 2006, pp. 27-37.

J-H. Hwang et al., "High-Availability Algorithms for Distributed Stream Processing," The 21st International Conference on Data Engineering (ICDE), Apr. 2005, pp. 779-790.

P. Pietzuch et al., "Network-Aware Operator Placement for Stream-Processing Systems," Proceedings of the 22nd International Conference on Data Engineering (ICDE), Apr. 2006, 12 pages.

O. Verscheure et al., "Finding "Who Is Talking to Whom" in VoIP Networks via Progressive Stream Clustering," Proceedings of the 6th International Conference on Data Mining (ICDM), Dec. 2006, pp. 667-677.

J. Dean et al., "MapReduce: Simplified Data Processing on Large Clusters," USENIX, 6th Symposium on Operating Systems Design and Implementation (OSDI), Dec. 2004, pp. 137-150.

R. Pike et al., "Interpreting the Data: Parallel Analysis with Sawzall," Scientific Programming Journal, Special Issue on Grids and Worldwide Computing Programming Models and Infrastructure, Oct. 2005, pp. 277-298, vol. 13, No. 4.

I. Rhee, "Optimal Fault-Tolerant Resource Allocation in Dynamic Distributed Systems," Proceedings of the 7th IEEE Symposium on Parallel and Distributed Processing, Oct. 1995, pp. 460-467.

R. Bhagwan et al., "Total Recall: System Support for Automated Availability Management," USENIX, Proceedings of the 1st Conference Symposium on Networked Systems Design and Implementation (NSDI), Mar. 2004, pp. 337-350.

F. Junqueira et al., "Surviving Internet Catastrophes," Proceedings of USENIX Annual Technical Conference, Apr. 2005, pp. 45-60.

P. Yalagandula et al., "Beyond Availability: Towards a Deeper Understanding of Machine Failure Characteristics in Large Distributed Systems," Proceedings of the Workshop on Real, Large Distributed Systems (WORLDS), Dec. 2004, 6 pages.

Y. Xing et al., "Providing Resiliency to Load Variations in Distributed Stream Processing," Proceedings of the International Conference on Very Large Databases (VLDB), Sep. 2006, pp. 775-786.

D.S. Turaga et al., "Resource Management for Networked Classifiers in Distributed Stream Mining Systems," Proceedings of the 6th International Conference on Data Mining (ICDM), Dec. 2006, pp. 1102-1107.

U.S. Appl. No. 11/735,026, filed in the name of N. Bansal et al. Apr. 13, 2007 and entitled "System and Method for Dependent Failure-Aware Allocation of Distributed Data-Processing Systems".

* cited by examiner

METHODS AND APPARATUS FOR RESOURCE ALLOCATION IN PARTIAL FAULT TOLERANT APPLICATIONS

This invention was made with Government support under Contract No.: H98230-07-C-0383 awarded by the Department of Defense. The Government has certain rights in this invention.

FIELD OF THE INVENTION

The present invention generally relates to distributed data processing systems and, more particularly, to techniques for allocating computing resources to partial fault tolerant applications in such distributed data processing systems.

BACKGROUND OF THE INVENTION

Distributed data processing systems need to be highly available and robust to failures. Traditional approaches to fault-tolerance employ techniques such as replication or check-pointing to address the availability requirements. However, these approaches introduce well-known tradeoffs between cost and availability. For example, a replicated service may incur significant overheads to provide strict consistency requirements. Further, the monetary cost of implementing highly available services can double for just a fraction of percentage of availability, and under correlated failures, even additional replicas result in a strong diminishing return in availability improvement for many replication schemes. Similarly, the overheads of check-pointing can limit its benefits.

Many distributed data processing systems (often operating under limited computing resources) have the property that they can continue operating and producing useful output even in the presence of application component failures, though the output quality may be of a reduced value. We refer to these applications herein as Partial Fault Tolerant (PFT) applications. In contrast to applications that require the availability of all components to operate correctly, PFT applications provide a "graceful degradation" in performance as the number of failures increases. For example, aggregation systems such as MapReduce (see, e.g., J. Dean et al., "MapReduce: Simplified Data Processing on Large Clusters," OSDI, 2004) based Sawzall (see, e.g., R. Pike et al., "Interpreting the Data: Parallel Analysis with Sawzall," Scientific Programming Journal, Special Issue on Grids and Worldwide Computing Programming Models and Infrastructure, 2005), SDIMS (see, e.g., P. Yalagandula et al., "A Scalable Distributed Information Management System," SIGCOMM, 2004), and PIER (see, e.g., R. Huebsch et al., "Querying the Internet with Pier," VLDB, 2003) are likely to be able to tolerate some missing objects while processing a query (e.g., AVG, JOIN, etc.) on a distributed database. Similarly, data mining application such as WTTW (see, e.g., Verscheure et al., "Finding 'Who is Talking to Whom' in VoIP Networks Via Progressive Stream Clustering," ICDM, 2006) and FAB (see, e.g., Turaga et al., "Online FDC Control Limit Tuning with Yield Prediction Using Incremental Decision Tree Learning," Sematech AEC/APC Symposium XIX, 2007) can still classify data objects under failures, though with less confidence. Further, for many stream processing applications with stringent temporal requirements (see, e.g., D. J. Abadi et al., "The Design of the Borealis Stream Processing Engine," CIDR, 2005), it is more important to produce partial results within a given time bound than full results delivered late. Finally, mission-critical applications deploy multiple sensors at different physical locations such that at least some of them should trigger an alert during failures or when operating conditions are violated (e.g., fire, medical emergencies, etc.).

However, none of the above fault-tolerance approaches adequately address (in terms of minimizing cost and maximizing availability) the assignment of PFT application components or, more generally, the allocation of computing resources in a distributed computing system, where the computing resources have certain failure characteristic and may be heterogeneous in nature.

SUMMARY OF THE INVENTION

Principles of the invention provide new techniques for assignment of PFT application components or, more generally, the allocation of computing resources in a distributed computing system.

For example, in one aspect of the invention, a method for allocating a set of one or more processing components of an application to a set of one or more resource groups comprises the following steps performed by a computer system. The set of one or more resource groups is ordered based on respective failure measures and resource capacities associated with the one or more resource groups. An importance value is assigned to each of the one or more processing components, wherein the importance value is associated with an effect of the processing component on the application output. The one or more processing components are assigned to the one or more resource groups based on the importance value of each processing component and the respective failure measures and resource capacities associated with the one or more resource groups, wherein processing components with higher importance values are assigned to resource groups with lower failure measures and higher resource capacities.

The application may be a partial fault tolerant (PFT) application that comprises a set of one or more PFT application components. The set of one or more resource groups may comprise a heterogeneous set of resource groups (or clusters of machines).

The ordering step may comprise sorting the one or more resource groups in a decreasing order. The step of sorting may be based on a ratio of a respective resource capacity of each of the one or more resource groups to a failure probability of each of the one or more resource groups. Alternatively, the step of sorting may be based on a product of a respective resource capacity of each of the one or more resource groups and an availability measure of each of the one or more resource groups. The availability measure for a given resource group may be computed as 1—failure probability of the given resource group.

An importance value may be based on a contribution that the processing component makes to the application output. Alternatively, an importance value may be based on a loss incurred in the application output value if the resource hosting the given processing component fails.

The allocating step may also be based on one or more specified constraints on the one or more components.

The allocating step may determine an order for assigning components based on a data flow graph associated with the application to a set of resource groups, such that a single resource group failure affects a minimal number of paths from a source (where computation on a data item is initiated) to a sink (where the final output is produced) in the data flow graph.

The allocating step may be performed after a failure of at least one of the components or resource groups (thus, it may also be considered a run-time reallocation).

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
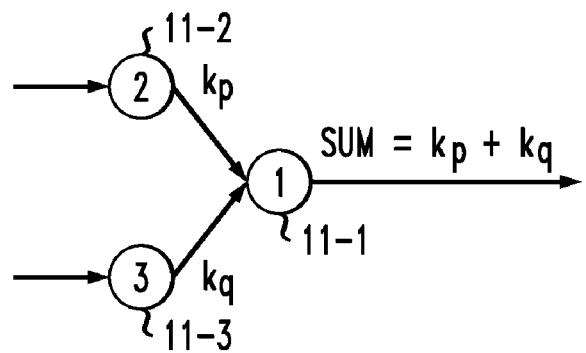
FIG. 1 illustrates a data aggregation system, according to one embodiment of the invention.

Illustrative principles of the invention address a key problem of how to assign PFT application components to a distributed computing system comprising a set of heterogeneous resource groups under a correlated failure model (also referred to herein as "clusters") with different resource capacities and availabilities. Specifically, a method for placement of processing components for PFT applications is provided that prevents, delays, or minimizes the "loss" in the expected application output value under failures before a full recovery from failures takes effect.

By way of example only, an application component may be defined as a set of software modules which perform various operations on input data elements in order to generate output data elements. Examples of input data elements include packets of audio data, email data, computer generated events, network data packets, or readings from sensors, such as environmental, medical or process sensors. Examples of transformations conducted by individual application components include parsing the header of a IP packet, aggregating audio samples into an audio segment or performing speech detection on an audio segment, sampling sensor readings, averaging or joining the readings over a time window of samples, applying spatial, temporal, or frequency filters to extract specific signatures over the audio or video segments, etc. The application components are composed into an application represented as a data-flow graph. A large number of such applications that can tolerate partial failures are PFT applications.

The method determines the assignment of PFT application components to clusters such that the loss in the output value of the PFT applications is minimized under failures. The method incorporates the following in computing the resource allocation: (i) a mathematical model of cluster failures where each cluster is assigned a failure probability under a correlated failure model, and where individual cluster failures are considered independent; (ii) the resource capacities of clusters; and (iii) the availability and the placement constraints provided by the applications.

The component allocation method includes the following steps.

1. First, the computing clusters are ordered—sorted in a decreasing order—based on the ratio of their resource capacity to the failure probability. Alternatively, the ordering may be done based on the product of resource capacity and (1—failure probability) (also referred to herein as availability).

2. Second, each application component is assigned a relative "importance value" (scalar value) defined as its contribution to the application output. Alternately, this importance value is the "loss" incurred in the application's total output value if the resource hosting that component fails.

3. Third, the component allocation method uses both (a) the importance metric to rank application components and (b) the sorted order of clusters so that highly important components get assigned to highly reliable computing clusters with high resource capacities.

The method may also include the step of allocating application components based on their specified constraints on resources (such as the need to be allocated to a cell blade or to a secure tamper-resistant node, etc.), while still addressing the goal of minimizing the loss in the application output value under failures.

The method determines an order for assigning components based on the application data flow graph such that a single cluster failure affects the minimal number of paths from a source to a sink.

The method aims to minimize the total weighted "loss" in the expected application output value for a plurality of applications when these applications execute on and share access to the same set of computing clusters. Further, the method may also include factors such as processing component reuse and input data reuse across a plurality of applications, relative priorities of applications in terms of ordering their expected output value, fault-tolerant characteristics of individual applications, and delay constraints on output response by an application, etc.

The method is also applied when a failure occurs in a PFT application, to reallocate the failed components to the available resource clusters.

Advantageously, the inventive method provides for component placement, wherein both resource capacities and failure probabilities are used to assign application components to computing clusters. Prior work (see U.S. patent application Ser. No. 11/735,026, "System and Method for Dependent-Failure Aware Allocation of Distributed Data-Processing Systems," filed Apr. 13, 2007, the disclosure of which is incorporated by reference herein) only uses resource capacities but not failure probabilities. As a result, the technique used in prior work might allocate all application components to the cluster with the largest capacity but having the smallest availability, thereby significantly reducing the availability of the application hosted on the distributed data processing system.

By way of further advantage, components are allocated in decreasing importance to clusters by defining a connected sub-graph comprising components that are all co-located on the same cluster. This allocation has the advantage of limiting the effect of a cluster's failure to the minimal number of paths from a source to a sink. Prior work assigns components to the same cluster that does not necessarily form a connected subgraph. Therefore, a single cluster failure can affect many more paths in the prior work's technique, which the above method for assigning processing components in this invention addresses.

Still further, the inventive method is applied during failure recovery. When a subset of the application components has failed, this method can be applied to restore the failed components to the available resources, thereby improving the application output value.

While certain illustrative embodiments of the invention will be described herein from the perspective of data stream applications, it is to be understood that the principles of the invention are not limited to use with any particular application or any data processing system. Rather, principles of the invention are more generally applicable to any application and any data processing system in which it would be desirable to minimize the effect of failures on the application output quality.

Assuming a distributed data processing system model, the problem can be precisely stated as follows. Given a distributed computing system comprising n clusters $(T_1, T_2, \ldots, T_n)$ each with a resource capacity $c_i$ and a failure probability $p_i$ (i ranges from [1, n]), and a PFT application made up of m components $(C_1, C_2, \ldots, C_m)$ each of which may execute on any cluster, allocate each of the m modules to one of the n clusters such that the loss in expected application output value is minimized under failures subject to the constraints imposed by the application data flow graph, the resource capacities, and the failure probabilities.

Thus, to overcome the above-mentioned drawback in distributed data processing systems (i.e., in the event of a failure-oblivious allocation of application components to computing clusters, even a single cluster failure can have a significant impact on the application's output quality if its highly important components were placed on that cluster), principles of the invention employ a "failure aware" design concept. Such a failure aware design concept provides the differentiation between clusters that are highly available and clusters that are most likely to fail, and uses this information to make assignment decisions of processing components to resource clusters.

FIG. 1 shows a data aggregation system according to one embodiment of the invention. As shown, the illustrative data aggregation system includes a plurality of components (11), wherein each component 11-2 and 11-3 receives the data inputs for aggregation. The components forward the inputs ($k_p$ and $k_q$) to the component 11-1 that computes the aggregate result; SUM in this case.

It is to be appreciated that such components may be logically allocated portions of processing resources (virtual machines) within one computing system, such as a mainframe computer. Alternatively, they could be allocated one or more types of computing devices, e.g., server, personal computer, laptop computer, handheld computing devices, etc. However, principles of the invention are not limited to any particular type of computing device or computing architecture. While the illustrative embodiment shows only three nodes, it is to be appreciated that the system can include more than three nodes.

Figure 2:
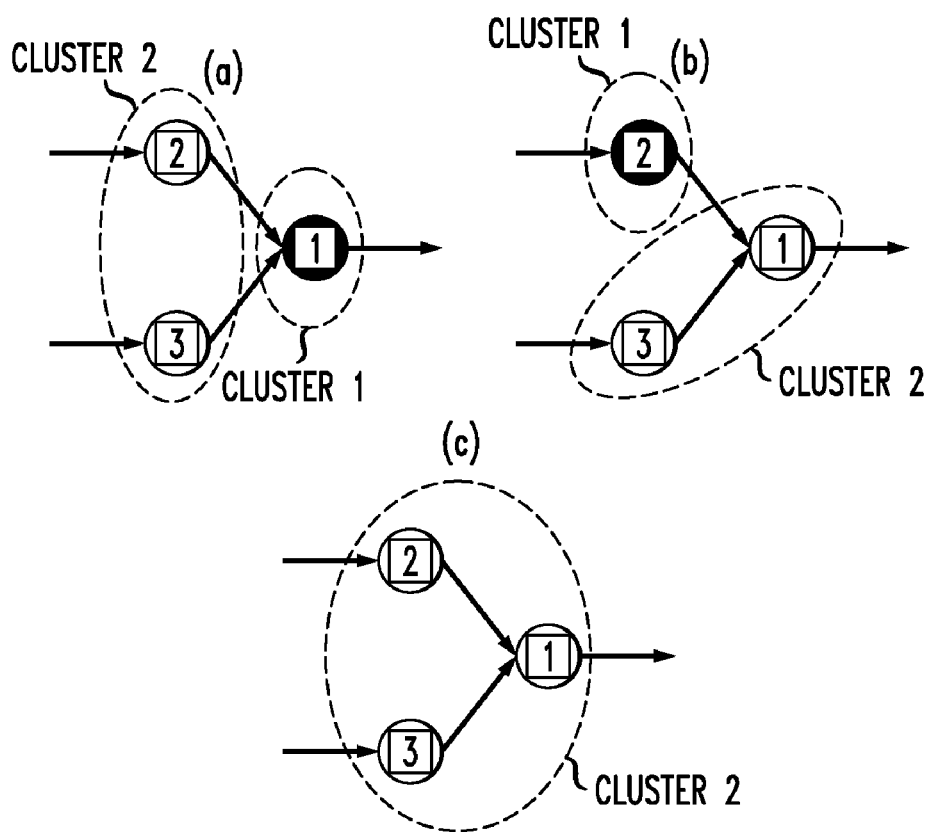
FIG. 2 illustrates three possible allocations of three processing components to two resource groups (clusters) for the data aggregation system in FIG. 1.

FIG. 2 illustrates three possible component allocations of three components to two clusters for the data aggregation system in FIG. 1: (a) assign root component 11-1 to one cluster (black shaded cluster or "cluster 1") and components 11-2 and 11-3 to another cluster (gray shaded cluster or "cluster 2"), (b) assign 11-1 and 11-3 to the gray cluster and 11-2 to the black cluster, and (c) assign all 11-1, 11-2, and 11-3 to the gray cluster.

Note that allocation (b) is better than allocation (a) because if the black cluster fails, then the application output for allocation (a) goes to 0. On the other hand, under allocation (b), the system could still process data flowing from 11-3 to 11-1. If the gray cluster fails, both allocations give no output. A careful calculation shows that the best allocation, however, is (c) that keeps all components on the same cluster. The main intuition behind this is that only one cluster failure scenario affects allocation (c), while two cluster failures scenarios can hinder allocations (a) and (b).

There are several important observations from this example. First, we observe that it is preferable to allocate as many components as possible to the same cluster (subject to cluster resource constraints) to minimize the loss in the expected output value under failures. Second, we observe that it is preferable to assign components on independent paths to different clusters to avoid dependent failures. Finally, for heterogeneous clusters with different failure probabilities, we observe that it is preferable to assign "highly important" components to clusters with the lowest failure probabilities. We use these observations in designing a component placement algorithm to be described below.

These observations suggest three guiding principles: (1) components of higher importance should be placed on clusters with highest capacities and lowest failure probabilities; (2) all components lying on a path from a source to the sink should be co-located on the same cluster (if possible), i.e., minimize the total number of clusters on all paths; and (3) assign components on independent paths to different clusters to avoid dependent failures.

The method of component allocation defines a connected sub-graph of processing components that are all allocated to the same resource cluster. The practical advantage of this method is to have minimal effect of a single cluster failure on the number of affected paths.

Figure 3A:
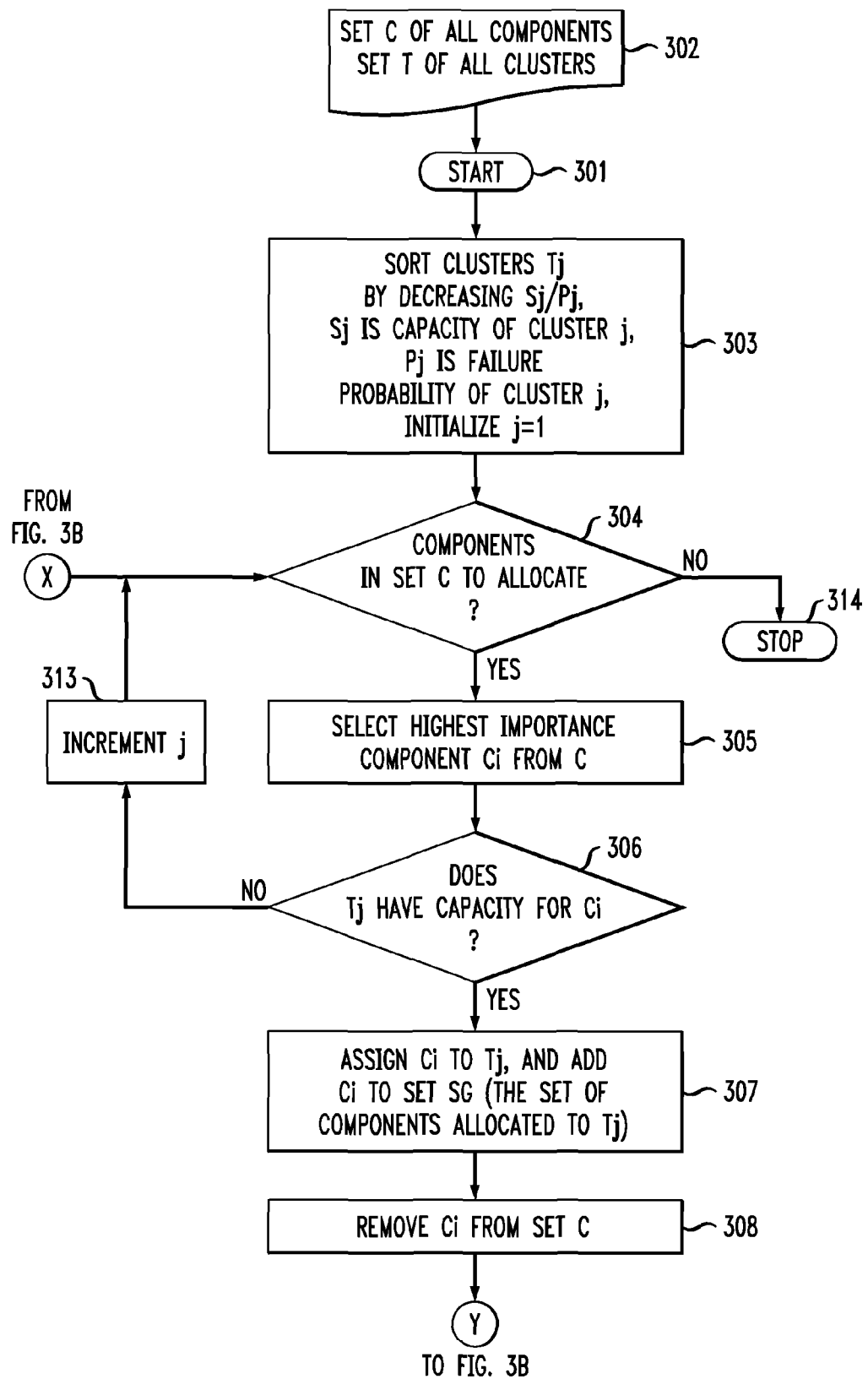
FIGS. 3A and 3B illustrate a methodology for allocating components of a PFT application running on distributed data processing systems, in accordance with one embodiment of the invention.
Figure 3B:
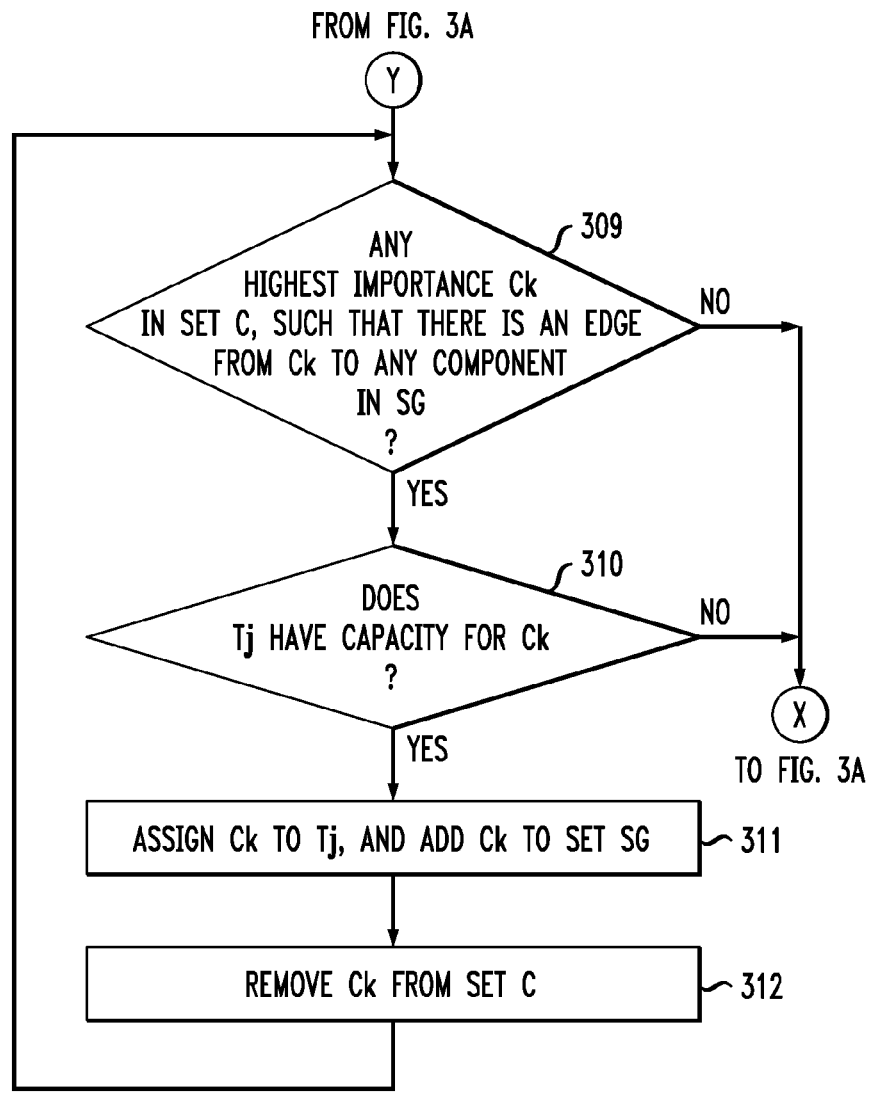

FIGS. 3A and 3B illustrate a flow diagram showing a method for allocating components of PFT application running on a distributed data processing systems in accordance with one embodiment of the invention.

In general, the steps of FIG. 3 correspond to the following pseudo-code which describes a fault-aware component placement algorithm. Thus, reference will be made below to the steps of FIG. 3 that correspond to the pseudo-code.

Algorithm 300 starts (301) by inputting (302) a set C of all PFT application components, a set T of all clusters, and the application data flow graph G(C, E). The algorithm proceeds as follows:

```
1: Calculate the importance I(C) for components C = {C_1,
   C_2,..., C_m} (303).
2: Rank the clusters T_1, T_2, ..., T_n sorted (decreasing) on
   c_j/p_j (j ranges from [1, n]) (303).
   3: j := 1 (303)
   4: while set C is not empty do (304)
   5: Select the highest importance component C_i from C (305)
   6: while T_j has spare capacity do (306)
   7: Assign C_i to T_j; remove C_i from set C; initialize set SG to {C_i}
   (307 and 308)
   8: Select highest importance C_k from C such that C_k is connected to
SG by an edge in E (as described below) (309)
   9: if C_k satisfying (8 :) AND T_j has spare capacity then (310)
   10: Assign C_k to T_j; remove C_k from set C; add {C_k} to SG
   (311 and 312)
   11: else {no such C_k exists OR T_j has no spare capacity}
   12: break;
   13: end if
   14: end while
   15: if T_j has no spare capacity then (306)
   16: j := j + 1 (313)
   17: end if
   18: end while
   19: stop (314)
```

Thus, in more general terms, given an application data flow graph G(V, E), the method for component assignment includes the following step: allocate components in decreasing importance to clusters ranked by $c_j/p_j$ (ranges from [1, n]). The method may further define a connected sub graph SG of components that are co-located on the same cluster (say T) as follows: at each step, assign the highest importance $C_k$ if: (1) T has spare capacity; and (2) $C_k$ is connected to SG by an edge in E, i.e., there is an edge from $C_k$ to $C_p$ and $C_p$ belongs to the sub-graph SG.

The method for component assignment may perform the step of allocating components in decreasing importance to clusters ranked by $c_j*(1-p_j)$ (j ranges from [1, n]) where $1-p_j$ is also termed as availability of a cluster.

Further, ties between clusters having an equal ratio of $c_j/p_j$ or $c_j*(1-p_j)$ can either be arbitrarily broken, or based on comparing $p_j$ values against a threshold and selecting the cluster with the smaller $p_j$ value, or based on comparing $c_j$ values against a threshold and selecting the cluster with the higher $c_j$ value, or based on selecting the cluster with the smaller $p_j$ value if both the clusters satisfy a minimum threshold of $c_j$, or based on selecting the cluster with the higher $c_j$ value if both the clusters satisfy a maximum threshold of $p_j$, or any combination of these schemes and other techniques.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
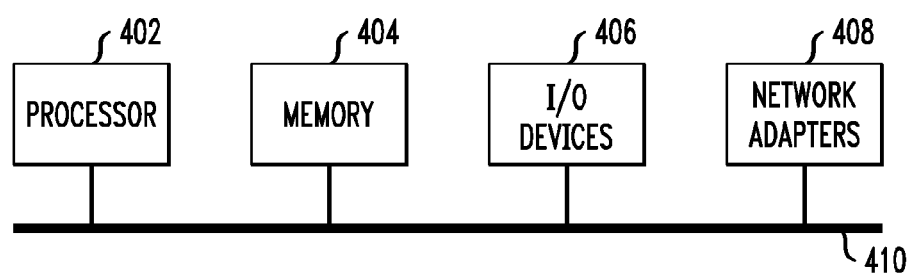
FIG. 4 illustrates a computing system in which methodologies of the invention may be implemented, according to one embodiment of the invention.

A data processing system suitable for storing and/or executing program code such as the computing system 400 shown in FIG. 4 may include at least one processor 402 coupled directly or indirectly to memory element(s) 404 through a system bus 410. The memory elements can include local memory employed during actual execution of the program code, bulk storage, and cache memories which provide temporary storage of at least some program code to reduce the number of times code is retrieved from bulk storage during execution. Input/output or I/O device(s) 406 (including but not limited to keyboards, displays, pointing devices, etc.) may be coupled to the system either directly or through intervening I/O controllers.

Network adapter(s) 408 may be included to enable the data processing system to become coupled to other data processing systems or remote printers or storage devices through intervening private or public networks. Modems, cable modem, and Ethernet cards are just a few of the currently available types of network adapters.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices. Thus, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for allocating a set of one or more processing components of an application to a set of one or more resource groups, comprising the steps performed by a computer system of:
    ordering the set of one or more resource groups based on respective failure measures and resource capacities associated with the one or more resource groups;
    assigning an importance value to each of the one or more components, wherein the importance value is associated with an effect of the one or more components on an output of the application; and
    assigning the one or more components to the one or more resource groups based on the importance value of each of the one or more components and the respective failure measures and resource capacities associated with the one or more resource groups, wherein the one or more components with higher importance values are assigned to resource groups with lower failure measures and higher resource capacities;
    wherein an order for assigning the one or more components is determined based on a data flow graph associated with the application such that a single resource group failure affects the minimal number of paths from a source to a sink in the data flow graph.

2. The method of claim 1, wherein the application is a partial fault tolerant (PFT) application that comprises a set of one or more PFT application components.

3. The method of claim 1, wherein the set of one or more resource groups comprise a heterogeneous set of resource groups.

4. The method of claim 1, wherein the ordering step comprises sorting the one or more resource groups in a decreasing order based on a ratio of a respective resource capacity of each of the one or more resource groups to a failure probability of each of the one or more resource groups.

5. The method of claim 1, wherein the ordering step comprises sorting the one or more resource groups in a decreasing order based on a product of a respective resource capacity of each of the one or more resource groups and an availability measure of each of the one or more resource groups.

6. The method of claim 5, wherein the availability measure for a given resource group is computed as one minus a failure probability of the given resource group.

7. The method of claim 1, wherein the importance value assigned to a given component is based on a contribution that the given component makes to the application output.

8. The method of claim 1, wherein the importance value assigned to a given component is based on a loss incurred in the application output value if the resource hosting the given component fails.

9. The method of claim 1, wherein the step of assigning the one or more components to the one or more resource groups is also based on one or more specified constraints on the one or more components.

10. The method of claim 1, wherein the step of assigning the one or more components to the one or more resource groups is performed responsive to a failure of at least one of the resources making unavailable at least one of the components assigned thereto.

11. The method of claim 1, wherein the effect of a given component on the output of the application comprises an effect of the given component on an output quality of the application.

12. The method of claim 11, wherein the effect of the given component on the application output quality is based on the given component being in one or more paths of the data flow graph associated with the application.

13. The method of claim 1, wherein the step of assigning the one or more components to the one or more resource groups comprises defining, within the data flow graph associated with the application, a connected sub-graph of components assigned to a given resource group.

14. An article of manufacture for allocating a set of one or more components of an application to a set of one or more resource groups, the article comprising a non-transitory computer readable storage medium containing one or more programs, which when executed by a computer implement the steps of claim 1.

15. Apparatus for allocating a set of one or more components of an application to a set of one or more resource groups, comprising:
  a memory; and
  at least one processor coupled to the memory and operative to perform the steps of:
  ordering the set of one or more resource groups based on respective failure measures and resource capacities associated with the one or more resource groups;
  assigning an importance value to each of the one or more components, wherein the importance value is associated with an effect of the component on an output of the application; and
  assigning the one or more components to the one or more resource groups based on the importance value of each of the one or more components and the respective failure measures and resource capacities associated with the one or more resource groups, wherein the one or more components with higher importance values are assigned to resource groups with lower failure measures and higher resource capacities;
  wherein an order for assigning the one or more components is determined based on a data flow graph associated with the application such that a single resource group failure affects the minimal number of paths from a source to a sink in the data flow graph.

16. The apparatus of claim 15, wherein the application is a partial fault tolerant (PFT) application that comprises a set of one or more PFT application components.

17. The apparatus of claim 15, wherein the ordering step comprises sorting the one or more resource groups in a decreasing order based on a ratio of a respective resource capacity of each of the one or more resource groups to a failure probability of each of the one or more resource groups.

18. The apparatus of claim 15, wherein the ordering step comprises sorting the one or more resource groups in a decreasing order based on a product of a respective resource capacity of each of the one or more resource groups and an availability measure of each of the one or more resource groups.

19. The apparatus of claim 15, wherein the importance value assigned to a given component is based on a contribution that the given component makes to the application output.

20. The apparatus of claim 15, wherein the importance value assigned to a given component is based on a loss incurred in the application output value if the resource hosting the given component fails.

* * * * *